United States Patent [19]
Williams

[11] 3,745,934
[45] July 17, 1973

[54] TROLLEY ARRANGEMENT FOR FREIGHT BRACING BULKHEAD ASSEMBLY

[75] Inventor: Gerald H. Williams, Detroit, Mich.

[73] Assignee: Evans Products Company, Plymouth, Mich.

[22] Filed: Sept. 1, 1971

[21] Appl. No.: 176,974

[52] U.S. Cl. .............................................. 105/376
[51] Int. Cl. .............................................. B60p 7/14
[58] Field of Search .................................... 105/376

[56] References Cited
UNITED STATES PATENTS

| | | | |
|---|---|---|---|
| 3,168,055 | 2/1965 | Vander Hyde et al. | 105/376 |
| 3,208,403 | 9/1965 | Magarian et al. | 105/376 |
| 3,641,942 | 2/1972 | Konrad et al. | 105/376 |

*Primary Examiner*—Drayton E. Hoffman
*Attorney*—J. King Harness, Ernest A. Beutler et al.

[57] ABSTRACT

A freight bracing bulkhead assembly embodying a low profile trolley shaft and an arrangement for driving the bulkhead along the overhead supporting rails and for precluding disengagement of the timing shaft with the rails.

8 Claims, 3 Drawing Figures

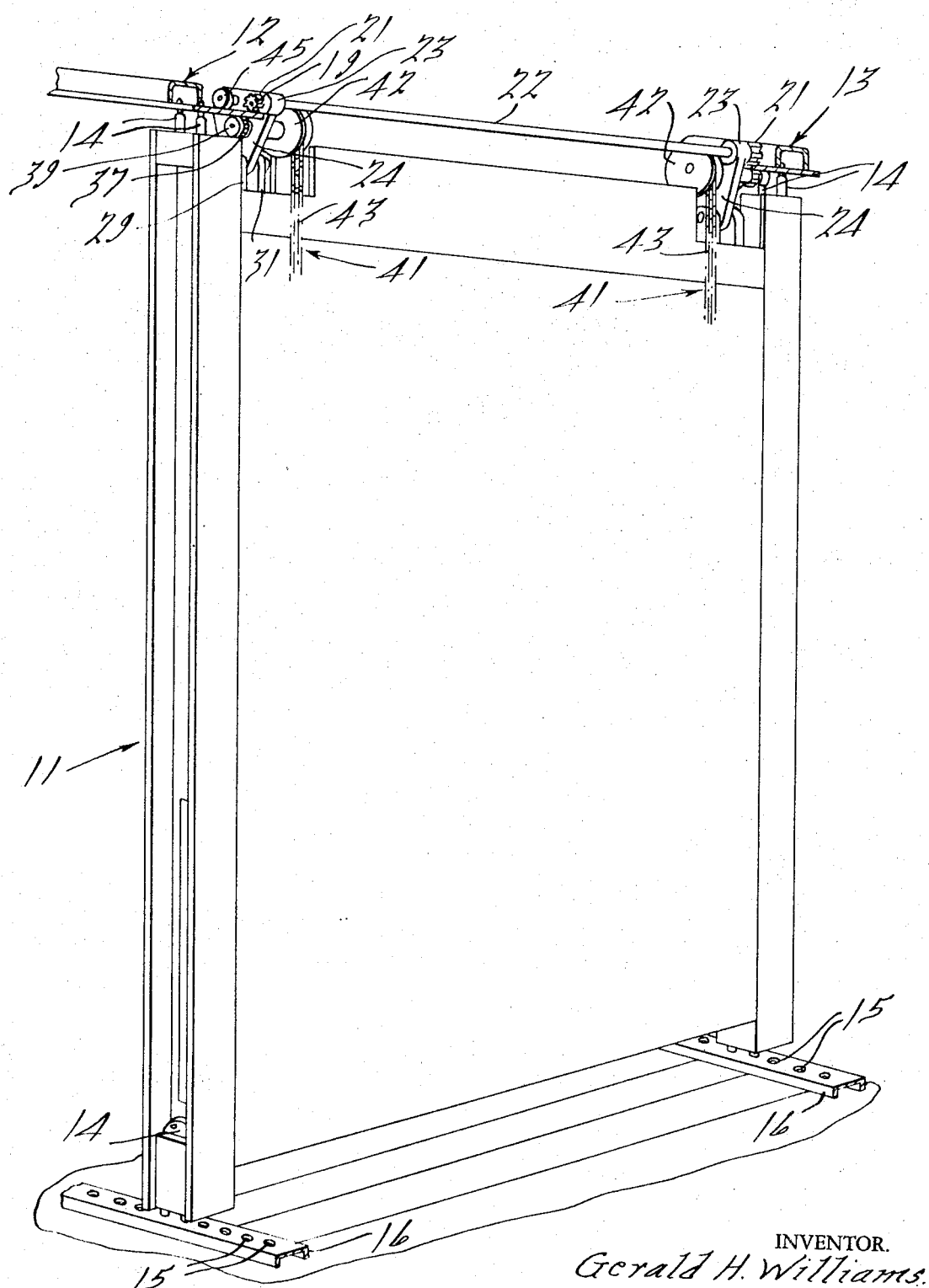

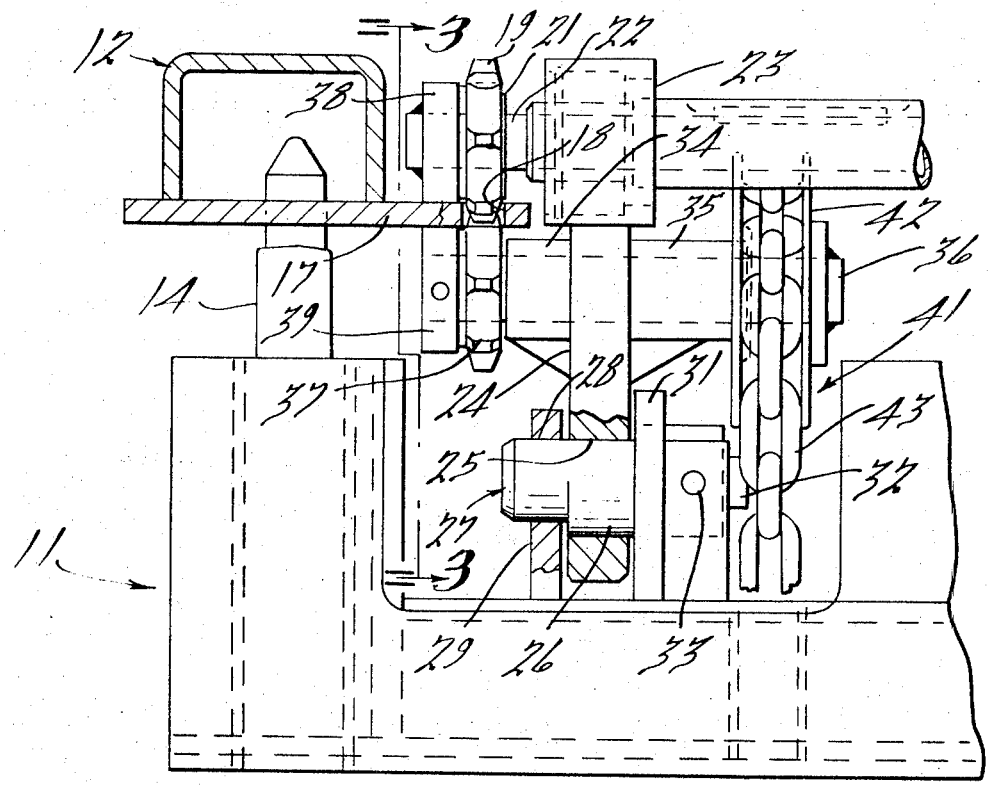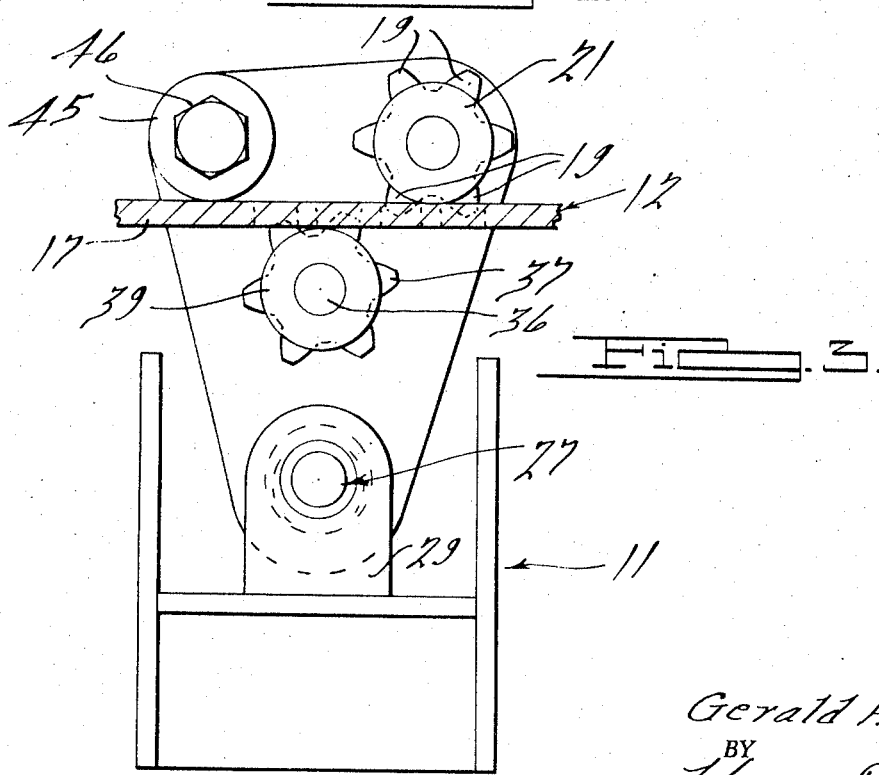

3,745,934

1

TROLLEY ARRANGEMENT FOR FREIGHT BRACING BULKHEAD ASSEMBLY

BACKGROUND OF THE INVENTION

This invention relates to a freight bracing bulkhead assembly and more particularly to an improved trolley arrangement for such an assembly.

The general construction of freight bracing bulkhead assemblies is well known. Such structures normally include a trolley arrangement at their upper end which cooperates with overhead crane rails for supporting the bulkhead assembly for movement along the cargo area in which it is used. The trolley shaft and its associated mechanism displaces a portion of the cargo area that would be otherwise occupied by cargo. For this reason, and to clear such overhead structures as air ducts it is generally desirable to maintain as low a profile for the trolley shaft as possible. With bulkhead assemblies having considerable height, such as those used in hi-cube railroad cars it has been the practice to attach chain fall to the trolley shaft to facilitate movement of the bulkhead along the car. In order to provide the necessary mechanical advantage the sprocket wheel of the chain fall should have a large diameter. This requirement is contrary to that of a low silhouette for the trolley arrangement.

It is, therefore, a principal object of this invention to provide an improved and low profile trolley arrangement for a bulkhead assembly.

It is a further object of this invention to provide a low profile bulkhead trolley arrangement that embodies a chain fall for facilitating adjustment in the position of the bulkhead.

In conjunction with the overhead trolley support for a bulkhead assembly it has been common practice to provide some arrangement for either precluding disengagement of the trolley wheels from the shaft or for holding the bulkhead assembly against falling in the event the trolley wheels do become disengaged. Normally this function has been provided by a structure that serves no other purpose.

It is, therefore, a further object of this invention to provide an improved low profile trolley arrangement in which the chain fall operates a sprocket wheel which sprocket wheel further serves to prevent disengagement of the trolley shaft from the supporting crane rails.

SUMMARY OF THE INVENTION

This invention is adapted to be embodied in a freight bracing bulkhead assembly that is adapted to be supported for longitudinal movement along a cargo area upon a pair of transversely spaced longitudinally extending rails. The bulkhead assembly is comprised of a bulkhead, a trolley shaft journalled by the bulkhead and a pair of rollers carried by the trolley shaft and adapted to be supported on the upper surfaces of the rails for supporting the bulkhead from the rails and for movement there along. A third roller is juxtaposed to one of the first pair of rollers and is adapted to engage the lower surface of the respective rail to cooperate with the first pair of rollers to prevent vertical movement of the bulkhead assembly relative to the rail.

BRIEF DESCRIPTION OF THE DRAWINGS

FIG. 1 is a perspective view of a freight bracing bulkhead assembly embodying this invention.

FIG. 2 is an enlarged plan view, with portions broken away and shown in section, of the upper corner of the bulkhead assembly of FIG. 1.

FIG. 3 is a cross sectional view taken along the line 3—3 in FIG. 2.

DETAILED DESCRIPTION OF THE PREFERRED EMBODIMENT

Referring first to FIG. 1, the reference numeral 11 indicates generally a freight bracing bulkhead assembly embodying this invention. The bulkhead assembly 11 is particularly adapted for bracing freight in vehicular cargo areas, such as in railroad box cars, but the invention is susceptible of use in other environments. The bulkhead assembly 11 is supported for longitudinal movement along the vehicular cargo area by means including a pair of overhead crane rails 12 and 13 that are affixed in any known manner to the cargo area. The bulkhead assembly includes locking pins 14 positioned at four corners of the bulkhead assembly and which have locking pin projections that are adapted to enter into holes in the crane rails 12 and 13 and into holes 15 formed in rails 16 that are fixed to the cargo area floor. The locking pins 14 are movable between their locked and their released positions in any known manner. Since this portion of the bulkhead assembly 11 forms no part of this invention, the construction will not be described in detail.

Referring now to FIGS. 2 and 3, the construction at the upper lefthand side of the bulkhead assembly 11, as viewed from FIG. 1, is shown in detail. It is to be understood that the construction at this side is the same as the construction at the upper righthand side and for this reason only one side will be described in detail.

The crane rail 12 has a horizontally extending section 17 that is formed with a series of longitudinally spaced openings 18 into which extend the teeth 19 of a sprocket wheel 21. The sprocket wheel 21 is non-rotatably affixed to a timing shaft 22 that extends across the width of the bulkhead assembly 11 for non-rotatably supporting the corresponding sprocket wheels that cooperate with the crane rail 13. The timing shaft 21 is journalled in a bearing block 23 that is affixed to a supporting plate 24. The supporting plate 24 depends from the timing shaft 22 and has a cylindrical bore 25 in which a cylindrical portion 26 of an adjusting shaft 27 is received. The adjusting shaft 27 has spaced cylindrical bearing portions 28 disposed on opposite sides of the cylindrical portion 26 that are journalled in upstanding plate like members 29 and 31 of the bulkhead assembly. The cylindrical portion 26 has its axis disposed eccentrically to the axes of the portions 28. The shaft 27 has a flat sided portion 32 that is adapted to be turned by a wrench or the like for vertically adjusting the position of the plate 24 and the structure carried by it relative to the remainder of the bulkhead assembly. A set screw 33 is provided for locking the shaft 27 in its adjusted position.

A pair of spaced cylindrical bearings 34 and 35 are affixed to opposite sides of the plate 24 at a location beneath the rail flange 17. A stub shaft 36 is journalled in these bearing sections and has a sprocket wheel 37 affixed to one of its ends. The sprocket wheel 37 has teeth that enter into the rail openings 18 for establishing a driving relationship between the sprocket wheel 37 and the crane rail 12. It will be noted from an inspection of FIG. 3 that the sprocket wheel 37 is offset from the sprocket wheel 21 in a longitudinal direction as well as in a vertical direction so that the teeth of the respective sprocket wheels engage adjacent of the openings 18. It should be readily apparent that cooperation of the sprocket wheels 21 and 37 with the rail 12 prevent vertical disengagement of the bulkhead assembly 11 from the crane rail 12. If desired, each of the sprocket wheels 21 and 37 may be provided with rollers 38 and 39 that also engage the rail flange 17 adjacent the openings 18.

In order to facilitate movement of the bulkhead assembly 11 along the length of the cargo area, a chain fall, indicated generally by the reference numeral 41 is provided for the stub shaft 36. The chain fall 41 includes a pulley 42 and chain 43 that is threaded around the pulley 42. The pulley 42 is affixed to the stub shaft 36 and, as is well known, the application of a force to the chain 43 will rotate the wheel 42, shaft 36 and sprocket wheel 37 to move the bulkhead assembly along the cargo area. Since the pulley 42 is affixed to the stub shaft 36 rather than to the timing shaft 22, as was heretofore conventional, a very low silhouette for the timing shaft and trolley assembly results. Also, the timing shaft 22 may be placed closely adjacent the roof of the cargo area to clear ducts etc.

In order to provide further support for the bulkhead assembly 11 and to further prevent cocking of the bulkhead assembly as it is moved along the cargo area, a second roller 45 is supported upon the plate 24 by means of a bolt or shaft 46. The roller 45 engages the upper side of the crane rail flange 17 and is disposed on the opposite side of a vertical plane containing the axis of the shaft 36 from the axis of the timing shaft 22. This arrangement has been found to improve the stabilization of the bulkhead support.

Since the roller 45 and sprocket wheels 21 and 37 are each carried by the respective plate 24 at the respective side of the bulkhead assembly 11 adjustment by rotation of the adjusting shaft 27 will simultaneously adjust each of these members. This adjustment is necessary in order to compensate for misalignments of the crane rails 12 and 13.

It is to be understood that the foregoing description is that of a preferred embodiment of the invention. Various changes and modifications may be made without departing from the spirit and scope of the invention as defined by the appended claims.

I claim:

1. A freight bracing bulkhead assembly adapted to be supported for movement along a cargo area upon a pair of transversely spaced longitudinally extending rails having a rack like configuration on the upper and lower surfaces thereof, said bulkhead assembly comprising a trolley shaft, a pair of sprocket wheels affixed against rotation relative to said trolley shaft at the ends thereof and adapted to be supportingly carried on the upper surface of said rails and engaging said rack like configuration thereupon, a bulkhead panel, means for suspending said bulkhead panel from said trolley shaft for supporting said bulkhead assembly upon said rails for movement along said rails, and a third sprocket wheel rotatably supported by said bulkhead assembly and juxtaposed to one of said first pair of sprocket wheels and adapted to engage the rack like configuration of the lower surface of the respective rail for coaction with said first pair of sprocket wheels to prevent vertical movement of said bulkhead assembly relative to the rails.

2. A freight bracing bulkhead assembly as set forth in claim 1 further including drive means for rotating the third roller for driving the bulkhead along the rails.

3. A freight bracing bulkhead assembly as set forth in claim 2 wherein the rack like configurations of the rails are formed by spaced apertures in the rails, 4. A freight bracing bulkhead assembly as set forth in claim 5 wherein the axis of the third sprocket is offset longitudinally from the axis of the respective sprocket of the first pair.

5. A freight bracing bulkhead assembly as set forth in claim 3 further including drive means for rotating the third sprocket for driving the bulkhead along the rails.

6. A freight bracing bulkhead assembly as set forth in claim 1 further including a fourth sprocket juxtaposed to the other of the first pair of sprockets and adapted to engage the rack like configuration on the lower surface of the respective rail for further aiding in the prevention of vertical movement of the bulkhead assembly relative to the rail.

7. A freight bracing bulkhead assembly as set forth in claim 1 wherein the sprocket of the first pair and the third sprocket are journalled by a common member that is adjustably supported relative to the bulkhead for compensating for misalignments in the rail.

8. A freight bracing bulkhead assembly as set forth in claim 1 further including a second pair of rollers adapted to engage the upper side of the rail in spaced relationship to the first pair of rollers, the axes of the first and second pair of rollers being positioned on opposite sides of a vertical plane containing the axis of the third roller.

* * * * *